United States Patent [19]

Bergsoe

[11] 4,013,456

[45] Mar. 22, 1977

[54] METHOD FOR TREATING FLUE DUST CONTAINING LEAD

[75] Inventor: Svend Bergsoe, Astrup, Denmark

[73] Assignee: Paul Bergsoe & Son a/s, Glostrup, Denmark

[22] Filed: June 4, 1975

[21] Appl. No.: 583,473

[30] Foreign Application Priority Data

June 12, 1974 Denmark .................... 3141/74

[52] U.S. Cl. ........................... 75/77; 75/3; 75/25
[51] Int. Cl.² ............................ C22B 13/00
[58] Field of Search .............. 75/25, 77, 5, 3

[56] References Cited

UNITED STATES PATENTS 2,139,065  12/1938  Betterton et al. ............... 75/25

FOREIGN PATENTS OR APPLICATIONS 27,762AD  1912  United Kingdom ................ 75/5

Primary Examiner—M. J. Andrews
Attorney, Agent, or Firm—Dressler, Goldsmith, Clement, Gordon & Shore, Ltd.

[57] ABSTRACT

A method for pretreating of flue dust having a content of lead therein, by which method the flue dust is fused at a relatively low temperature without any substantial reduction taking place, whereupon the slag thus formed is cooled until solidification, reagents for the improvement of the process and/or the material being added at one or more of the process steps before, during or after fusion of the flue dust, said reagents comprising slag-forming chemicals, a material for raising the melting temperatures, and a ferrous reduction agent. Item an apparatus for the pretreatment of flue dust in accordance with the above method and comprising a fusing furnace with a hearth and heating means and having an outlet leading to a vessel for collecting the molten material, conveying means for feeding the flue dust to the fusing furnace from a dust collecting device, and dispensing means for dispensing additive reagents to either the flue dust, the fusing furnace or the molten material flowing therefrom through the outlet or simultaneously to more of said positions and at a rate proportional to the flue dust feed rate. The vessel for collecting the molten material may comprise heating means and means for stirring the slag.

10 Claims, 1 Drawing Figure

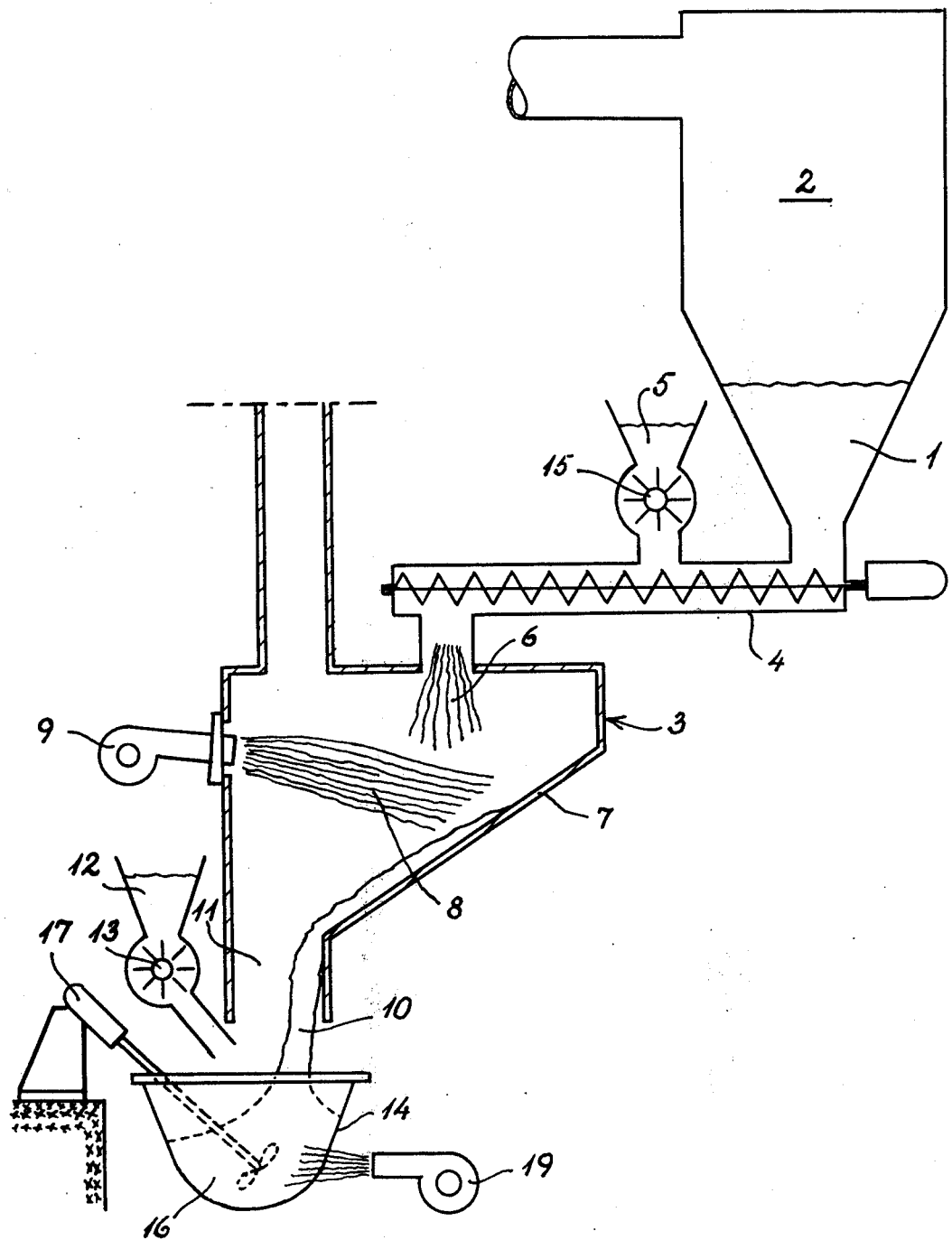

METHOD FOR TREATING FLUE DUST CONTAINING LEAD

The present invention relates to a method of pre-treating flue dust containing lead prior to a reduction thereof in a metallurgical furnace, and also to an apparatus to carry the method into effect.

When scrap materials containing lead, e.g. from storage batteries, are smelted in metallurgical furnaces for the purpose of recovering lead and other metals contained therein, some metalliferous dust is formed as a by-product. This so-called flue dust is carried with the hot gases leaving the furnace through the vent pipes arranged for this purpose, and it is known after cooling of the smoke to collect the dust in electrostatic filters, bag filters or other separation devices and to return it to the said metallurgical furnaces in order to recover its contents of metal.

The dust consists mainly of lead oxide and small quantities of oxides of other metals, which have been present as alloying components or impurities in the original furnace charges. However, the dust also contains other chemical compounds of the metals present, especially chlorides, sulphides and sulphates. When it is attempted to smelt and reduce the flue dust in metallurgical furnaces, either separately or mixed with other materials, some of the dust will again be carried off with the hot gases, and formation of new dust will also take place by evaporation and subsequent condensation of metalliferous compounds. Even if the necessary reducing and slagging agents are present in the furnace charges, only a partial reduction of the returned flue dust will be obtained, and continued operation will increase the quantity of circulating flue dust, and at the same time its composition will be adversely changed, as the quantity of chlorides, sulphides and sulphates, which are not readily reduced, is increased relative to that of oxides so that the content of metal is reduced.

The present invention has for its object to provide a method of pre-treating flue dust containing lead, by which method the aforesaid disadvantages are eliminated and a material is produced which is more suitable for treatment in a metallurgical furnace, seeing that a surprisingly large increase of the yield of metal is obtained by the method as compared with the yield obtainable by the known technique.

According to the invention this is achieved by fusing the flue dust at a relatively low temperature without any substantial, simultaneous reduction, and by cooling the formed slag till it solidifies, thereby making it possible to add process- and/or material-improving reagents at one or more stages of the process before, during or after the fusion.

The flue dust coming from filters and smoke-cleaning plants is exceedingly fine-grained, and only an agglomeration into larger particles can reduce the re-formation of dust during the subsequent smelting in the furnace. When heated, the flue dust starts to get lumpy and subsequently it becomes fluid at a temperature which depends on its composition, particularly the impurities contained, such as tin. When the molten material is cooled till it solidifies, continuous solidified blocks are obtained which do not give rise to the problems referred to in the introduction.

In one embodiment of the method according to the invention slag-forming chemicals are added prior to the melting, such as borax and/or sodium carbonate. Such addition facilitates the melting of the flue dust.

In a second embodiment of the method according to the invention there is added before, during or after the fusion a material raising the melting point, e.g. lime. By this means the melting temperature of the mass of dust is increased in order to avoid melting of the solidified blocks of material during the subsequent treatment in a metallurgical furnace, such as a shaft furnace, before they have reached the smelting zone of the shaft furnace. In this way it is avoided that the charged material melts in the upper part of the shaft and in the form of a blanket obstructs the passage of air through the furnace.

In a preferred embodiment of the method according to the invention there is added to the fluid material after the fusion a ferrous reduction agent in the form of pyrite cinder, iron oxide, iron scale or iron fillings or a mixture of two or more of these reagents. This again increased the melting temperature of the mass of dust, so that also in this way it is avoided that the material melts before having reached the smelting zone of the shaft furnace. On the contrary, the solid, hardened blocks support the structure in the shaft. As compared with the addition of lime, the addition of iron makes the solidified mass harder and better suited for charging and furnace treatment, and at the same time the iron serves to combine with sulphur and other impurities during the subsequent reduction process. Thus the addition of ferrous material in the pre-treatment replaces an admixture of corresponding material which would otherwise have to be added in the course of the subsequent charging of the furnace.

The invention also refers to an apparatus to carry the method into effect, which said apparatus comprises a per se known separation device for flue dust and a fusing furnace with a hearth and heating means and with an outlet and a collecting vessel, and also a conveyor arranged to feed the flue dust in an even flow from the separation device to the fusing furnace, and means arranged to dispense additive reagents in proportion to the quantity of dust being fed, either to the flue dust or to the fusing furnace or to the molten mass flowing from the outlet thereof or simultaneously to several of these places.

In one embodiment of the apparatus according to the invention the collecting vessel has heating means and means for stirrng the fluid slag. These features provide a particularly effective distribution and consequently an increased effect of the additive reagents, which are added to the molten mass at the outlet of the fusing furnace.

The invention will now be described in more detail, reference being had to the drawing which shows schematically an apparatus according to the invention.

In the shown apparatus the flue dust 1 containing lead is collected in a separation device 2 in a smoke-cleaning plant. The flue dust 1 is taken to a fusing furnace 3 by means of a conveyor 4, shown in the drawing as a worm conveyor. An additive 5, such as sodium carbonate or borax, can be added to the flue dust 1 in the conveyor 4 from a dispensing apparatus 15, which in known manner can be arranged to dispense in proportion to the quantity of flue dust conveyed at any time by the conveyor 4. During such an addition in the conveyor 4, the conveyor also operates as a mixing apparatus for the flue dust 1 and the additive 5. In the fusing furnace 3 the mixture of dust 6 thus produced falls upon an inclined hearth 7, where it is heated by the flame 8 of an oil burner 9, placed opposite to and directed towards the hearth 7. The molten mass 10 flows down the hearth 7 to an outlet 11, where an additive 12, e.g. in the form of a fine-grained, ferrous material, can be supplied from a dispensing apparatus 13, which may be controlled in the same way as the dispensing apparatus 15 referred to in the foregoing. The slag 16 thus produced now flows down into a collecting vessel, where it is kept heated by means of an oil burner 19 while being constantly stirred by means of a stirring machine 17. When the vessel 14 is full, the stirring machine 17 is removed, and the vessel may either be emptied into another vessel or be exchanged for a corresponding vessel, the slag 16 being in any case cooled till it solidifies, subsequently to be divided, if so desired, into suitable blocks for charging in a metallurgical melting furnace.

The types of flue dust referred to in the foregoing do not have specific melting points, but when heated they start to get soft and sticky and tend to get lumpy, and at a certain higher temperature they become fluid. This latter temperature is hereinafter called the melting temperature of the material. Lead flue dust containing no tin typically has a melting temperature of 580° C, and this is to say that it is quite easily fusible, which means that it will melt "too early" in a shaft furnace.

Experiments have proved that the melting temperature can be substantially increased when the material is pre-treated by the method according to the invention:
to 680° C by the addition of 5% of pyrite cinder, and
to 850° C by the addition of 15% of pyrite cinder.

If the flue dust contains tin it has in itself a higher melting temperature, e.g. 750° C, but also this temperature can be increased by pre-treating the material according to the method of this invention:
to 800° C by the addition of 5% of pyrite cinder, and
to 870° C by the addition of 10% of pyrite cinder.

When hydrated lime is added instead of pyrite cinder a somewhat higher melting temperature is obtained at the same percentage of additive, or the same melting temperatures can be obtained at a reduced addition.

When untreated flue dust is smelted and reduced in a metallurgical furnace, the yield of metal will often amount to only 50–60% of the quantity of dust. When smelting flue dust pretreated by the method according to the invention but otherwise under corresponding conditions, the applicants have obtained a yield of metal amounting to 70 to 73% of the quantity of dust, which corresponds to abt. 95% of the theoretical yield, that is to say of the total metal contents of the dust as determined by analysis.

The invention is not limited to the embodiments heretofore described or to the apparatus described in the foregoing and shown in the drawing, but also comprises such modifications as will be obvious to one skilled in the art without departing from the scope of the following patent claims.

I claim:

1. A method of recovering metal from flue dust having lead oxide therein, comprising the steps of:
   heating and fusing the flue dust to a molten and substantially fluid mass in a fusing furnace without substantial simultaneous reduction;
   adding a pre-treating material prior to cooling said substantially fluid mass for facilitating the recovery of metal from said flue dust;
   cooling the mass until said mass solidifies;
   forming and preparing said solidified mass for charging into a metallurgical furnace;
   charging said prepared mass into said metallurgical furnace; and
   smelting and reducing said prepared mass in said metallurgical furnace.

2. A method in accordance with claim 1 wherein said pre-treating material includes a slag-forming material for facilitating melting of said flue dust and said pre-treating material is added prior to heating and fusing said flue dust.

3. A method in accordance with claim 2 wherein said pre-treating material includes borax.

4. A method in accordance with claim 2 wherein said pre-treating material includes sodium carbonate.

5. A method in accordance with claim 2 further including the steps of mixing the slag-forming material with said flue dust and simultaneously conveying the flue dust and slag forming material to said fusing furnace.

6. A method in accordance with claim 1 wherein said pre-treating material is a melting-retardant material for increasing the melting temperature of said mass.

7. A method in accordance with claim 6 wherein said melting-retardant material is lime.

8. A method in accordance with claim 6 wherein said melting-retardant material is a ferrous reduction agent which further assists in said smelting and said ferrous reduction agent is added after each fusing.

9. A method in accordance with claim 8 wherein said ferrous reduction agent is selected from the group consisting substantially of pyrite cinder, iron oxide, iron scale and iron filings.

10. A method in accordance with claim 1 further including the steps of:
    collecting said flue dust in a separation device;
    conveying said flue dust to said fusing furnace;
    collecting the molten slag in a collecting means;
    heating the molten mass in said collecting means; and
    stirring said molten mass in said collecting means.

* * * * *